2,782,179
Patented Feb. 19, 1957

2,782,179

PROCESS FOR PREPARING POLYTETRAFLUORO-ETHYLENE-ASBESTOS COMPOSITIONS

John F. Lontz, Wilmington, Del., assignor to E. I. du Pont de Nemours and Company, Wilmington, Del., a corporation of Delaware No Drawing. Application January 14, 1953, Serial No. 331,303

2 Claims. (Cl. 260—41)

This invention relates to filled polymer compositions and, more particularly, to polymeric tetrafluoroethylene compositions having increased stiffness and other improved properties.

Polymeric tetrafluoroethylene possesses a combination of unusual properties and is particularly useful because of its excellent chemical inertness, high-grade dielectric properties and stability at high temperatures relative to other synthetic polymers. It has already been suggested that fillers such as graphite, coke flour, powdered copper, zircon, asbestos, and similar fillers may be incorporated with polymeric tetrafluoroethylene for achieving certain properties. However, there are particular molding and extrusion applications in which it would be desirable to obtain a combination of high stiffness, low deformation under load, low coefficient of thermal expansion, and low flexural creep in polymeric tetrafluoroethylene compositions, which combination of properties has not existed in any such compositions disclosed in the prior art.

It has now been discovered that a particularly desirable combination of improved properties is achieved in compositions comprising finely divided polymeric tetrafluoroethylene containing uniformly dispersed therein between 20 percent and 75 percent of the asbestos by weight, based on the combined weight of polymeric tetrafluoroethylene and asbestos present in said compositions. For most molding applications, it is preferred to use asbestos in amounts of 50 percent to 75 percent; whereas for extrusion it is preferred to use from 25 percent to 50 percent asbestos. The invention also comprises certain processes for the preparation of said compositions, as set forth below.

The polymeric tetraflurorethylene suitable for use in this invention may be prepared by any suitable method which produces a normally solid polymer having a sintering temperature of at least 300° C., preferably a sintering temperature in the neighborhood of 327° C., provided the particles are not larger than approximately 500 microns. This polymer may be prepared according to U. S. Patents 2,230,654—Plunkett, 2,393,967—Brubaker, and 2,394,243—Joyce, the latter two processes normally leading to granular particles of macro size; that is, of relatively large particle size compared to particles of colloidal size. These macro particles should be sub-divided (e. g. by micropulverizing) before using in this invention, so at least 90 percent of the particles are between 100 and 500 microns. Or the polymer may be prepared by the methods such as are described in U. S. Patents 2,534,058—Renfrew, and 2,559,752—Berry, which normally leads to a polymer having particles of colloidal size.

The asbestos used in preparing the compositions of this invention may be any of the commonly known forms provided it is of short fiber length, so that the particles are relatively small and can be readily dispersed with the polymer particles. Preferably, the asbestos should be predried above 400° C. before mixing with the polymeric tetrafluoroethylene in order to prevent loss in weight, presumably due to occluded water, when the filled polymer is sintered. Where maximum corrosion resistance is desired in the filled compositions, the crude asbestos is preferably given an aqueous acid wash before predrying.

In the lower ranges of loading with asbestos filler, various methods may be used for mixing the filler with the polymer particles for achieving good physical properties in the filled polymer articles fabricated from these compositions. For example, the asbestos and polymer may be mixed dry or in an aqueous medium, followed by drying. Heretofore, it has not been possible to mix common fillers such as coke flour and graphite with sufficient uniformity to reproduce accurately physical strength values using filler loadings of 50 percent and higher with the macro particles of polymeric tetrafluoroethylene, such as are generally produced in the polymerization process of Brubaker, U. S. Patent 2,393,967. Apparently, when these attempts were made, only ordinary mixing resulted, as evidenced by poor stiffness and other physical properties of articles molded therefrom. Within the composition range of this invention, however, it has now been discovered that essentially the same stiffness is obtained at equivalent loadings with asbestos-filled macro particles of polymeric tetrafluoroethylene, which have been sub-divided so that the particles are not larger than approximately 500 microns, as with asbestos-filled colloidal particles of this polymer. In addition, the stiffness of the asbestos-filled compositions is significantly higher than those of the polymer containing equivalent loadings with other fillers. This is true so long as the mixtures are prepared in a manner to yield good homogeneity. Thus, when mixing asbestos with the sub-divided macro particles of polymer, it has been found that the polymer as obtained from the polymerization process should be micro-pulverized while admixed with the asbestos particles. When this mixture, micropulverized together, is in turn molded and sintered, the resulting shaped articles posses outstanding physical properties; e. g., high stiffness, and low deformation under load, as may be seen in the examples given below. When mixing asbestos with colloidal particles of the polymer, it is usually desirable to mix an aqueous slurry of the asbestos with an aqueous dispersion of the colloidal polymeric tetrafluoroethylene using mild agitation, although the dry asbestos may be slowly added to the aqueous polymer dispersion while stirring. If the polymeric tetrafluoroethylene is of colloidal size dispersed in water without a dispersion stabilizer, the asbestos may be added to the aqueous slurry of polymer, first with mild agitation, for example, by means of a paddle agitator or a "Lightnin" mixer, followed by vigorous mechanical agitation which coagulates any polymer particles of colloidal size. The mixture then may be filtered and dried. If the polymeric tetrafluoroethylene is dispersed as colloidal sized particles in an aqueous medium containing a dispersion stabilizer, usually a nonionic or anionic stabilizer such as a polyglycol alkylaryl ether, a sodium alkyl sulfate, or any of the other suitable stabilizers disclosed in U. S. Patents 2,478,229 and 2,559,752, the asbestos may be slowly added while stirring to the aqueous slurry, followed by addition of acetone to the mixture of asbestos and aqueous polymer slurry, while the slurry is being agitated mildly. The acetone overcomes the effect of the dispersion stabilizer and coagulates the colloidal particles of polymeric tetrafluoroethylene. The resulting product then is filtered and dried before further use. The drying may be done at any convenient temperature up to the sintering temperature of the polymer; a suitable drying temperature is about 100° C. to 120° C.

In general, the dried mixture of asbestos and polymeric tetrafluoroethylene may be fabricated into shaped articles by molding, extruding or calendering, preferably under pressures exceeding 1000 pounds per square inch, and either simultaneously or subsequently subjecting the mixture to a temperature above the sintering temperature of the polymeric tetrafluoroethylene. The sintering temperature, in general, will be in the range of 300° C.–450° C., but preferably about 327° C.–410° C. This sintering operation may be done in the fabrication apparatus, or by placing the shaped articles in a heated oven, or in a high-temperature liquid bath, or by subjecting them to any other suitable source of heat within the range specified. Specifically for compression molding the compositions of this invention, pressures lower than 1000 pounds per square inch may in some cases be used for hot pressing, and pressures up to 10,000 pounds per square inch, and, in some cases, even higher may be used with advantage for cold pressing into shaped articles.

The advantages of asbestos over other fillers incorporated in the polymeric tetrafluoroethylene are apparent from the examples, which show the striking superiority in stiffness, both at room temperature and elevated temperature, exhibited by the polymer compositions filled with asbestos, particularly in the range of 50 percent to 75 percent asbestos by weight. Other advantages possessed by the asbestos-filled compositions are their low deformation under load, low flexural creep, high corrosion resistance, good dimensional stability and low coefficient of thermal expansion. This combination of properties exhibited by the asbestos-filled polymeric tetrafluoroethylene compositions is particularly advantageous when the compositions are fabricated into rigid piping for use in piping corrosive liquids.

The filled polymer compositions in general may be fabricated into various articles by molding, extruding, and calendering. In addition to pipes, the compositions may also be used by fabrication into valve trim (e. g., seats and discs), sheets, rods, tubes, gaskets, packing, pump components (impellers and housings), bearings, and electrical applications such as wire and cable insulation, molded shapes, separators, standoff insulators, and the like.

The following examples illustrate specific embodiments of this invention, and are not intended to limit the scope of the invention, which is set forth in the appended claims. All proportions are expressed by weight, unless otherwise specified.

*Example 1.*—A series of filled polymeric tetrafluoroethylene compositions was prepared in essentially the same manner in order to show the difference in physical properties of moldings made therefrom due to the presence of the different fillers. The results are given in the table below.

The micropulverized polymeric tetrafluoroethylene used was obtained according to Brubaker U. S. Patent 2,393,967 in the form of relatively large particles, which were sub-divided in a micropulverizer using liquid nitrogen with floats grade 7M asbestos fibers. This grade of asbestos is of short fiber length and was used in all tests reported in this and other examples. The resulting mixture of polymer and asbestos particles passed through a U. S. Standard Sieve Series Size No. 20, 10 percent of which passed through Sieve Size No. 200.

The colloidal particles of polymeric tetrafluoroethylene used in this example were obtained according to Berry U S. Patent 2,559,752 in the form of an aqueous colloidal dispersion of the polymer, having 30 percent to 35 percent polymer by weight, and without addition of any more stabilizer for the dispersion. Each filler used was slurried in distilled water, using a paddle agitator. With the agitator stopped, the polymer dispersion was added and mixed gently by hand with a spatula. Mild agitation prevented the polymer from coagulating, yet effected complete mixing of the polymer and filler, and required only 10–15 seconds. The polymer was then coagulated by introducing a high speed agitator, operated at 1750 R. P. M. until complete coagulation occurred. The slurry was filtered through coarse cloth on a vacuum filter. The filter cake was spread out on trays and dried at 120° C. for 5 hours. The dried product was screened through a U. S. Standard Sieve Size No. 4 before molding. The dry powdered mixtures of filler and polymer (or 100 percent polymer in the case of the two control samples) were fed into rectangular molds for determination of physical properties. The loaded mold was compressed at room temperature at 10,000 pounds per square inch for 3 minutes. The entire mold and contents were then placed in an air oven at 390° C. and sintered for a sufficient length of time to allow the interior of the mold to reach 390° C. and be maintained at that temperature for at least one hour. After sintering, the entire mold was removed from the oven to a press and cooled at room temperature under a pressure of 2000 pounds per square inch. The molded shapes were removed from the mold, and test specimens were cut to 2 x ½ x ¼ inches for measurement of flexural modulus of elasticity according to ASTM D–790, which is otherwise known as stiffness and reported herein as such. Test specimens ½ x ½ x ½ inch were cut for measuring the percent deformation under a load of 2000 pounds per square inch at 50° C. for 24 hours, according to ASTM D–621. The values of deformation given in the table were determined by measuring the test specimens after 24 hours while still under load in order to account for the elastic recovery of these particular compositions, rather than by first removing the specimen from the test apparatus as is described in the ASTM specification. Test specimens 5 x ½ x ¼ inches were cut for measuring the flexural creep. For this test various loads were applied at the center of a 4-inch span, and the test run at 23° C. at 50 percent relative humidity. The deflection of the specimen under a given load is measured periodically over about 100 hours. The deflection is a measure of the maximum fiber strain of the sample, and the calculated maximum fiber strain is plotted against time. The strain rate or creep rate is calculated from the slope of the above plotted graph. This creep rate in turn is plotted against the various loads at 100 hours. Expanding this data, which is a straight line function, from 100 hours to one year, the creep rate is given in the table below for a load of 1000 pounds per square inch.

Table

| Polymer Used [1] | Filler Used (Wt. Percent) | Creep rate at 1,000 p. s. i. (23° C.), Percent/ year | Percent Deformation under load (50° C.) | ASTM stiffness (flexural modulus) p. s. i. (23° C.) | ASTM stiffness, p. s. i. (165° C.) |
|---|---|---|---|---|---|
| M | 0 | 18.4 | 25 | 80,000 | 16,000 |
| M | 50 asbestos | | 0.96 | 241,000 | 138,000 |
| C | 0 | | | 81,000 | |
| C | 20 asbestos | | | 148,000 | 47,000 |
| C | 52.5 asbestos | 0.87 | 0.96 | 335,000 | 176,000 |
| C | 20 coke flour | | | 110,000 | 22,000 |
| C | 50 coke flour | 1.43 | 1.56 | 135,000 | 57,000 |
| C | 20 graphite | | | 130,000 | 27,000 |
| C | 50 graphite | 2.02 | 3.25 | 189,000 | 72,000 |

[1] M=micropulverized particles; C=colloidal particles.

From the above table, it may be seen that 20 percent asbestos imparts to polymeric tetrafluoroethylene essentially the same stiffness as 50 percent loading with coke flour.

*Example 2.*—Good dimensional stability in molded test pieces made from the compositions of this invention was demonstrated by comparing a series of molded and sintered compositions, and measuring the dimensional changes in these specimens on heating as follows:

Each test composition was prepared under essentially the same conditions from a mixture of colloidal particles of polymeric tetrafluoroethylene and finely divided filler, each filler being 50 percent by weight of the composition.

Each composition was prepared and then molded and sintered under essentially the same conditions as Example 1 to give a small rod 1.125 inches in diameter by 0.750 inch long. These rods were carefully measured then subjected to heating cycles at 120° C. and 200° C. The results given in the table below show the dimensional change as percent increase in length based on the original length. From these results, it may be concluded that the asbestor-filled moldings are several times more resistant to dimensional change than equivalent carbon-filled and graphite-filled moldings with the same filler loading. The heating cycles for each rod are reported only as long as a change in length occurs; in each case the percent expansion has leveled off to a constant figure at the longest time reported.

Table

| Filler Used (50%) | Temperature (° C.) | Hours Heated | Percent Expansion |
|---|---|---|---|
| Coke flour | 120 | 2 | 0.81 |
| | | 4 | 0.94 |
| | | 8 | 0.94 |
| | | 12 | 1.07 |
| | 200 | 2 | 1.35 |
| | | 4 | 1.49 |
| | | 8 | 1.62 |
| Graphite | 120 | 2 | 0.94 |
| | | 4 | 1.21 |
| | 200 | 2 | 1.91 |
| | | 4 | 2.19 |
| | | 8 | 2.19 |
| | | 12 | 2.32 |
| Asbestos | 120 | 2 | 0.13 |
| | 200 | 2 | 0.68 |

These dimensional changes can be troublesome in the case of articles such as molded pump impellers. Thus in the case of a molded pump impeller made from a 50:50 mixture of polymeric tetrafluoroethylene and carbon intended for handling a liquid at 100° C., the molding should first be heated for 12 hours at 120° C. or 8 hours at 200° C. before being machined to final dimensions. An impeller molded from a 50–50 polymer-asbestos mixture according to this invention would be heated for only 2 hours at 120° C. before final machining for the same use.

In a separate test where rectangular moldings were made from filled polymeric tetrafluoroethylene containing approximately 50 percent by weight of filler loading, it was found that the linear coefficient of thermal expansion of the asbestos-filled molding was much lower than that of similarly prepared graphite and carbon-filled moldings. That is, the coefficient for the asbestos composition in the range of 25° C.–70° C. was $1.52 \times 10^{-5}/°$ C.; for graphite $2.50 \times 10^{-5}/°$ C.; for carbon $3.49 \times 10^{-5}/°$ C.; for the pure unfilled polymer $12.5 \times 10^{-5}/°$ C.; and for 100% steel $1.5 \times 10^{-5}/°$ C.. In the range of 70° C.–190° C., asbestos was $0.87 \times 10^{-5}/°$ C.; graphite $1.89 \times 10^{-5}/°$ C.; and carbon $4.03 \times 10^{-5}/°$ C. This data shows that the asbestos-filled polymer molding at this filler loading is much more useful in certain applications where it is to be in contact with steel, such as in gaskets, pump and valve components and other moving parts, since the coefficient of thermal expansion of the asbestos-filled polymer composition is more nearly equal to that of steel than the other filled polymer compositions.

I claim:
1. Process for preparing a composition capable of being molded into articles having high stiffness and dimensional stability, which process comprises adding together in an aqueous medium 80 to 25 parts by weight of tetrafluoroethylene homopolymer particles of colloidal size and 20 to 75 parts by weight of finely divided dispersible asbestos until a homogeneous mixture of the two wet solids is obtained, then coagulating the polymer particles, removing the aqueous medium and drying the solid mixture.

2. Process of claim 1 wherein there is employed 25 to 50 parts of polymeric tetrafluoroethylene particles of colloidal size and 75 to 50 parts of finely divided asbestos.

References Cited in the file of this patent
UNITED STATES PATENTS

| 2,396,629 | Alfthan et al. | Mar. 19, 1946 |
| 2,400,099 | Brubaker et al. | May 14, 1946 |
| 2,468,664 | Hanford et al. | Apr. 26, 1949 |
| 2,531,007 | Strom et al. | Nov. 21, 1950 |
| 2,559,752 | Berry | July 10, 1951 |
| 2,685,707 | Llewellyn et al. | Aug. 10, 1954 |

OTHER REFERENCES

Ind. & Eng. Chemistry, vol. 42, May 1950, page 848.